Aug. 26, 1941. P. M. HALL 2,253,702
WELDING MACHINE
Filed June 8, 1940 2 Sheets-Sheet 1
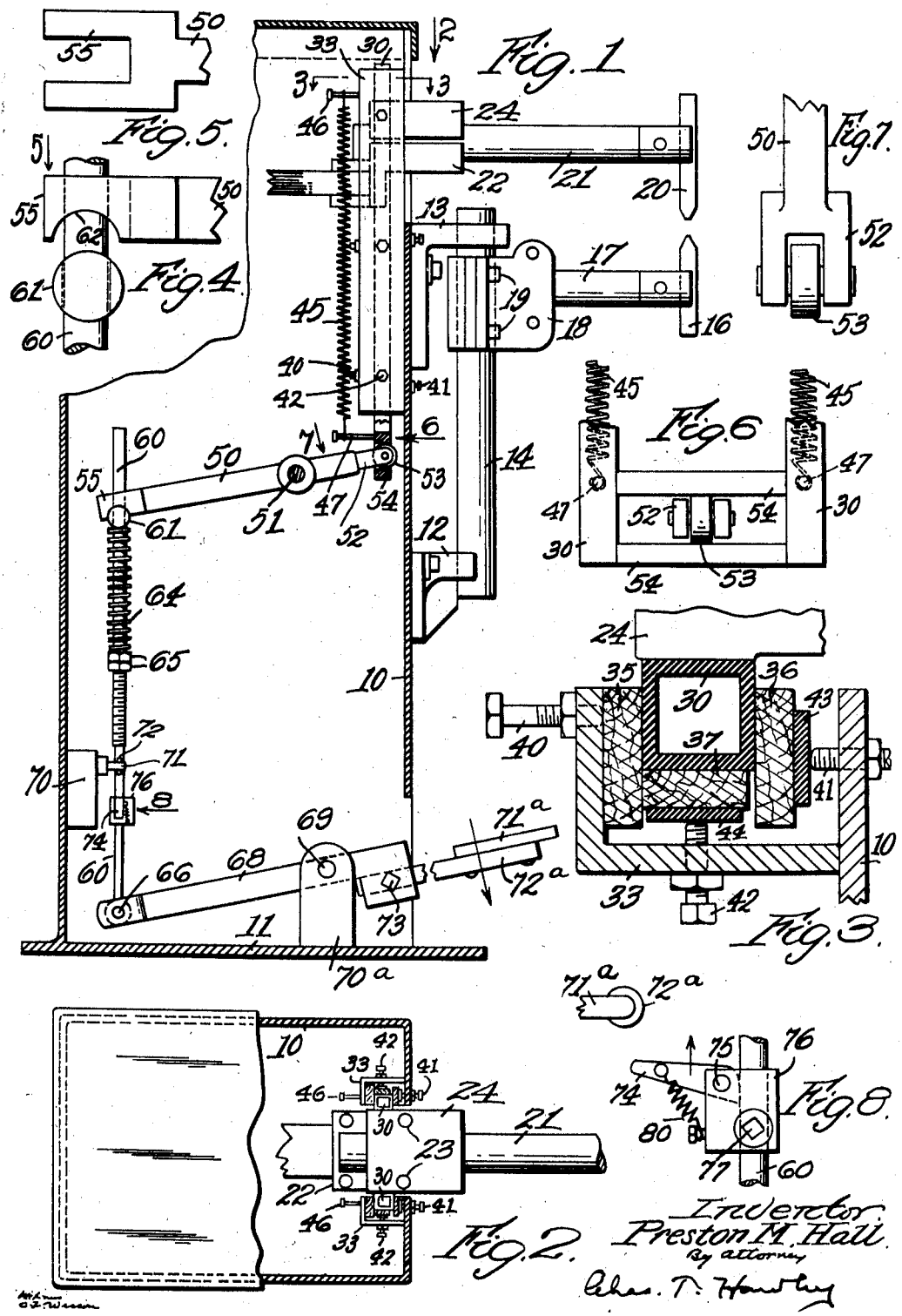

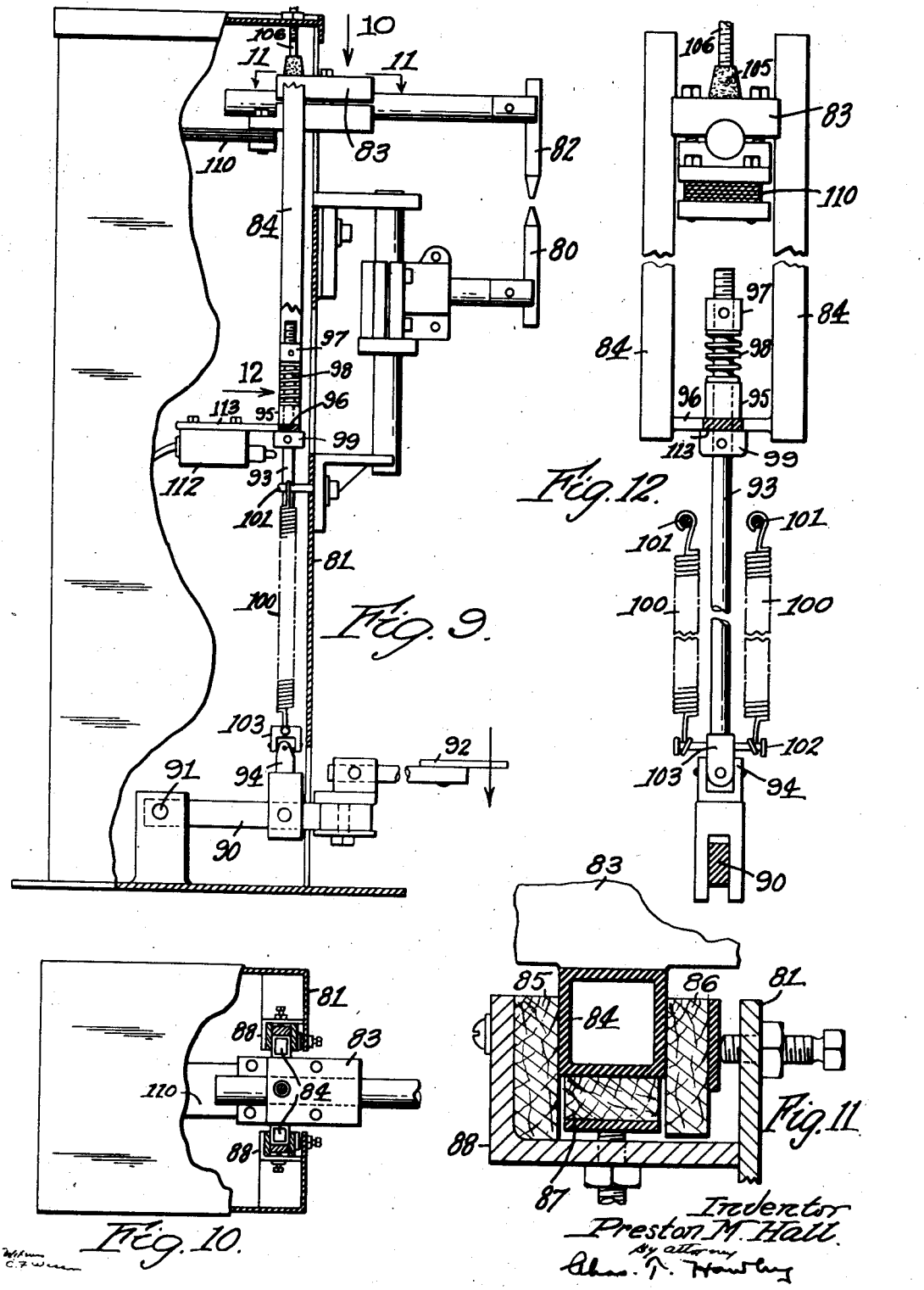

Patented Aug. 26, 1941

2,253,702

UNITED STATES PATENT OFFICE 2,253,702

WELDING MACHINE

Preston M. Hall, Worcester, Mass.

Application June 8, 1940, Serial No. 339,465

2 Claims. (Cl. 219—4)

This invention relates to welding machines of the type in which one of the electrodes is mounted for manual movement toward and from welding position.

It is the general object of my invention to provide improved means for supporting the movable electrode in such a machine and for guiding said electrode in straight-line movement.

A further object of the invention is to provide improved manual means for moving the electrode to and from welding position and for applying yielding pressure thereto.

My invention further relates to arrangements and combinations of parts which will be hereinafter described and more particularly pointed out in the appended claims.

Preferred forms of the invention are shown in the drawings, in which

Fig. 1 is a partial sectional side elevation of one form of my improved welding machine;

Fig. 2 is a plan view thereof, partly in section;

Fig. 3 is an enlarged detail sectional view, taken along the line 3—3 in Fig. 1;

Fig. 4 is a detail view of certain actuating elements;

Fig. 5 is a partial detail plan view, looking in the direction of the arrow 5 in Fig. 4;

Fig. 6 is an enlarged partial front view of certain parts, looking in the direction of the arrow 6 in Fig. 1;

Fig. 7 is a partial plan view of an actuating lever, looking in the direction of the arrow 7 in Fig. 1;

Fig. 8 is a detail front elevation of a switch-actuating member, looking in the direction of the arrow 8 in Fig. 1;

Fig. 9 is a side elevation, partly in section, showing a second form of my invention;

Fig. 10 is a plan view, partly in section, looking in the direction of the arrow 10 in Fig. 9;

Fig. 11 is an enlarged partial sectional plan view, taken along the line 11—11 in Fig. 9; and Fig. 12 is a rear elevation of certain parts, looking in the direction of the arrow 12 in Fig. 9.

Referring to Figs. 1 to 8, my improved welding machine in the form shown therein comprises a rectangular casing 10 mounted on a suitable base 11. Brackets 12 and 13 are secured to the front side of the casing 10 and support an upright shaft 14. A lower electrode 16 is clamped in the outer end of a rod or anvil 17, which in turn is adjustably clamped or otherwise secured in a stand 18. The stand 18 is vertically and angularly adjustable on the upright shaft 14 and may be secured in adjusted position by clamping bolts 19.

The electrode 16 may thus be rigidly supported at any desired elevation and in any desired angular position. The manner of mounting the electrode 16 forms no part of my present invention.

The movable electrode 20 is clamped in the outer end of a supporting rod or anvil 21, which in turn is secured by a clamping plate 22 and bolts 23 (Fig. 2) to the upper end of a slidable supporting member 24. Upright guide-bars 30 are fixed to the sides of the member 24 and are preferably made in the form of rectangular metal tubes, as shown in Fig. 3.

Means for guiding the bars 30 for vertical movement comprises brackets 33 (Figs. 2 and 3), preferably welded to the casing 10 and forming supports for guide members 35, 36 and 37. These guide members are shown herein as comprising strips of wood, specially oil-treated to provide self-lubricating guiding surfaces. The strips 35, 36 and 37 may be adjusted to accurately position the guide-bars 30 by means of a plurality of set-screws 40, 41 and 42. Metal bars, as 43 and 44, may be interposed to take the thrust of the adjusting screws, or metal guide strips may be used.

By adjusting the screws 40, 41 and 42, the guide-members for the guide-bars 30 may be accurately positioned with respect to the casing 10, and lost motion of the guide-bars may be substantially eliminated.

The movable electrode 20 is thus supported for straight line vertical movement toward and away from the fixed electrode 16, rather than for the usual swinging movement commonly provided in this type of welding machine.

Springs 45 are interposed between studs 46 (Fig. 1) fixed in the casing 10 and studs 47 fixed in the lower portions of the guide-bars 30. The springs 45 are of sufficient strength to counterbalance the weight of the movable parts and to normally maintain the movable electrode yieldingly in raised position.

An actuating lever 50 is mounted on a shaft 51 pivoted in the sides of the casing 10 and its forked front end 52 is provided with a roll 53, which roll is positioned between cross bars 54 supported between the lower ends of the guide-bars 30.

At its rear end, the lever 50 is forked as shown at 55 (Fig. 5) to slidably receive an upright rod 60. A cylindrical block 61 is slidably mounted on the rod 60 and is seated in open bearings 62 in the forked end 55 of the lever 50. A coil spring 64 is mounted on the upright rod 60, and the rod is threaded to receive lock nuts 65 by which the lower end of the spring 64 is supported. The upper end of the spring engages the block 61 and forces it upward against the open bearings in the lever 50.

The lower end of the rod 60 is pivoted at 66 to the rear end of a foot lever 68, which in turn is pivoted at 69 on a fixed stand 70. A pedal 71 is secured at the front end of a rod 72 which is clamped to the lever 68 by a binding screw 73, so that the parts 68, 71 and 72 collectively form a foot lever for actuating the movable electrode.

When the pedal 71 is moved downward by pressure applied thereto, the pressure will be transmitted through the rod 60, spring 64 and block 61 to the actuating lever 50, and thence through the roll 53 and tubular members 30 to the stand 24 and to the movable electrode 20.

After the electrode 20 has engaged the work, the spring 64 will yield, so that the pressure applied to the work cannot exceed the adjusted strength of the spring 64.

Preferably a switch 70a is mounted within the casing 10 and is provided with an actuating arm 71a and roll 72a (Fig. 8) positioned for engagement by a latch 74 pivoted at 75 on a collar 76 adjustably secured on the rod 60 by a clamping screw 77. The latch 74 is yieldingly held in the position shown in Fig. 8 by a spring 80, and engages the roll 72a to close the switch 70a and cause the welding current to be turned on as the rod 60 moves upward. The latch 74 commonly moves beyond the roll 72a in its upward travel, so that the switch is released while foot pressure is still applied to the movable electrode. Any usual timing device may be provided to break the welding circuit at any desired interval after the switch 70a is released.

On the return or downward movement of the rod 60, the latch 74 swings yieldingly upward as it passes the roll 72a and thus has no operative effect on the switch 70a.

The usual transformer will be provided within the casing 10, and heavy-capacity connections will be made to the electrode supports or anvils 17 and 21. These connections are not shown herein, as they form no part of the present invention.

From the foregoing description, it will be seen that I have provided a welding machine in which the movable electrode has a carefully guided straight-line vertical movement, with the welding pressure under spring control, and with the electrode 20 moving in the same direction as the pedal 71, which is obviously to be desired. The actuating mechanism is entirely enclosed within the casing 10, and no part of the mechanism extends out of the casing except the pedal 71 and its supporting rod 72.

In the form of my invention shown in Figs. 9 to 12, the fixed electrode 80 is adjustably mounted on the frame or casing 81, as in the construction shown in Fig. 1. The movable electrode 82 is also similarly secured to a stand or support 83, preferably provided with tubular guiding members 84 disposed at each side of said stand and slidable between guide strips 85, 86 and 87, adjustably held by brackets 88 fixed to the inside of the frame 81.

A foot lever 90 is pivoted at 91 within the casing 81 and is provided with an adjustable pedal extension 92. A pull rod 93 has a swivel connection 94 to the lever 90, and at its upper end extends through a bearing 95 mounted in a cross bar 96 at the lower end of the sliding stand or support 83.

A collar 97 is threaded on the upper end of the pull rod 93, and a compression spring 98 is interposed between the collar 97 and the bearing 95.

A second collar 99 is mounted on the rod 93 and forms a stop by engagement with the under side of the cross bar 96. Tension springs 100 are secured at their upper ends to fixed studs 101 and at their lower ends to a cross pin 102 fixed in a block 103 forming the lower end of the rod 93 and coacting with the swivel connection 94. The springs 100 are of sufficient strength to overbalance the weight of the sliding stand or support 83 and the parts carried thereby, and normally maintain an abutment 105 (Fig. 9) on the stand 83 against a stop screw 106.

Current is supplied to the movable electrode 82 through a connection 110 (Fig. 9), and the current flowing in the connection 110 is controlled by a switch 112 mounted on an arm 113 which is a lateral extension of the cross bar 96. The switch 112 thus moves vertically with the sliding stand 83.

The collar 99 on the pull rod 93 is of such size that it will engage and close the switch 112 when it is moved downward away from the cross bar 96, which relative movement occurs when the pedal is further depressed after the movable electrode 82 has engaged the work to be welded.

From the foregoing description, the operation and advantages of this form of my invention will be readily understood. The stand or support 83 is mounted for vertical straight-line sliding movement as in the form previously described and is directly actuated by the lever 90 and foot pedal 92, with the electrode 82 moving in the same direction as the pedal.

The pedal is depressed against the tension of the springs 100 until the electrode 82 has been brought into engagement with the work. After such engagement, the pull rod 93 may be further depressed against the pressure of the spring 98, and such further movement will cause the collar 99 to engage and close the switch 112, thus turning on the welding current.

Any usual timing device (not shown) may be provided to break the welding circuit at any desired interval after the closing of the switch 112. Such devices are in common use, however, and form no part of my present invention.

Having thus described my invention and the advantages thereof, I do not wish to be limited to the details herein disclosed, otherwise than as set forth in the claims, but what I claim is:

1. In a welding machine having a casing and fixed and movable electrodes, in combination, a sliding stand for the movable electrode, means to guide said stand to give said movable electrode a straight-line movement toward and from the fixed electrode, manually operated means including a yielding connection for moving said sliding stand and electrode to welding position, and self-acting means to return said stand and electrode to inoperative position, said manual operating means including a foot lever pivoted within said casing, a pull rod having a swivel connection to said lever and extending loosely through a bearing in said sliding stand and a spring interposed between a collar on the upper end of said pull rod and the upper face of said bearing.

2. In a welding machine having a casing and fixed and movable electrodes, in combination, a sliding stand for the movable electrode, means to guide said stand to give said movable electrode a straight-line movement toward and from the fixed electrode, manually operated means including a yielding connection for moving said sliding stand and electrode to welding position, and self-acting means to return said stand and electrode to inoperative position, said manual operating means including a foot lever pivoted within said casing, a pull rod having a swivel connection to said lever and extending loosely through a bearing in said sliding stand, and a spring interposed between a collar on the upper end of said pull rod and the upper face of said bearing, and said self-acting means comprising a pair of tension springs which apply balanced upward tension to the lower end of said pull rod and which are effective to overcome the weight of the movable parts associated with said foot lever.

PRESTON M. HALL.